United States Patent [19]
Takahashi

[11] Patent Number: 6,103,352
[45] Date of Patent: Aug. 15, 2000

[54] DECORATED SHEET

[75] Inventor: Kazuhiro Takahashi, Shinjuku-ku, Japan

[73] Assignee: Dai Nippon Printing Co., Ltd., Japan

[21] Appl. No.: 09/051,714

[22] PCT Filed: Aug. 28, 1997

[86] PCT No.: PCT/JP97/03000

§ 371 Date: Apr. 17, 1998

§ 102(e) Date: Apr. 17, 1998

[87] PCT Pub. No.: WO98/08682

PCT Pub. Date: May 3, 1998

[30] Foreign Application Priority Data

Aug. 28, 1996 [JP] Japan ................................. 8-243980

[51] Int. Cl.[7] ........................................................ B32B 3/00
[52] U.S. Cl. .................. 428/195; 428/76; 428/542.2; 428/542.6
[58] Field of Search .................. 428/195, 76, 542.2, 428/542.6; 442/164, 381, 392; 525/66, 64

[56] References Cited

U.S. PATENT DOCUMENTS

| | | |
|---|---|---|
| 4,600,628 | 7/1986 | Ishii et al. . |
| 4,664,965 | 5/1987 | Okita et al. . |
| 5,098,788 | 3/1992 | Petrie et al. . |
| 5,580,610 | 12/1996 | Moy . |
| 5,633,317 | 5/1997 | Kawasaki et al. ........................ 525/66 |
| 5,827,788 | 10/1998 | Miyakoshi .............................. 442/164 |

FOREIGN PATENT DOCUMENTS 19535934  4/1997  Germany .
6-88394  11/1994  Japan .

OTHER PUBLICATIONS

Database WPI, Section Ch, Week 9035, Derwent Publications Ltd., JP 02 185710 Jul. 1990, Abstract Only.
Database WPI, Section CH, Week 8617, Derwent Publications Ltd., JP 60 224119 Nov. 1985, Abstracts Only.
Database WPI, Section Ch, Week 8539, Derwent Publications Ltd., JP 60 154327 Aug. 1985, Abstract Only.

*Primary Examiner*—William Krynski
*Assistant Examiner*—Hong J. Xu
*Attorney, Agent, or Firm*—Parkhurst & Wendel, L.L.P.

[57] ABSTRACT

A decorative sheet provided with a surface protective layer is provided which is excellent in both surface protective properties and bonding strength between layers. The decorative sheet 10 according to the present invention comprises: a substrate sheet 1; a contiguous layer 4 provided on the substrate sheet 1; and a surface protective layer 5 provided on the contiguous layer 4 containing a compound having active hydrogen, the surface protective layer 5 comprising an ionizing radiation-curing resin and an isocyanate compound, the contiguous layer 4 and the surface protective layer 5 being in a cured state.

10 Claims, 1 Drawing Sheet

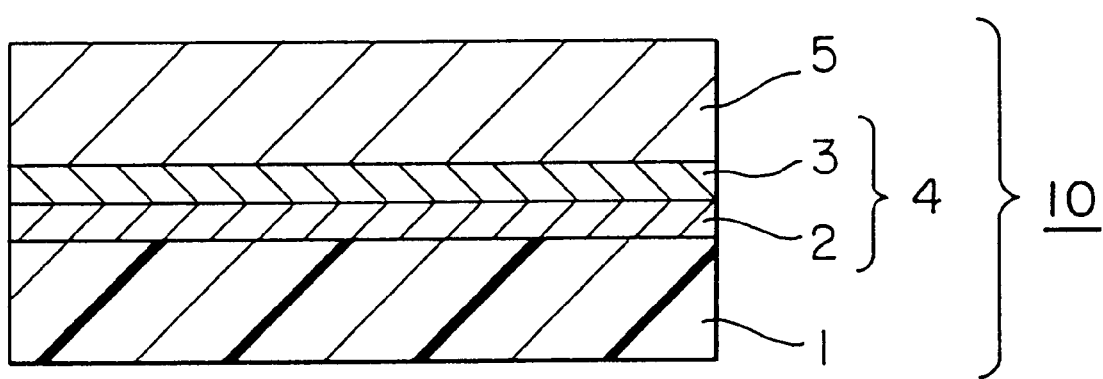
F I G. 1

DECORATED SHEET

TECHNICAL FIELD

The present invention relates to a decorative material and particularly to a decorative material, for building materials, which can impart a desired design to the surface of furniture, wall surface, and floor covering and the like and possesses excellent surface protective properties.

BACKGROUND ART

A decorative sheet comprising a surface protective layer, constituted by a layer of a resin cured by ionizing radiation irradiation, provided on the surface of a decorative sheet for a building material has been proposed in the art.

Since this conventional surface protective layer is in a cured state, the layer strength of the surface protective layer per se is excellent. However, when the surface protective layer is provided contiguously to other layer(s), that is, when a solid print layer, a pattern layer and the like and the surface protective layer are laminated on a substrate sheet, the adhesive strength between the solid print layer and the pattern layer and the surface protective layer is disadvantageously low. Therefore, the conventional decorative sheet has poor Hofmann's scratch resistance and, hence, in some cases cannot be practically used because the decorative sheet particularly in its horizontal face portion is easily scratched.

DISCLOSURE OF THE INVENTION

An object of the present invention is to solve the above problem of the prior art and to provide a decorative sheet possessing high adhesive strength between the surface protective layer and each layer laminated onto the surface protective layer and, in addition, excellent scratch resistance.

According to the present invention, the above problem can be solved by incorporating a compound having active hydrogen into any one of a surface protective layer and a layer contiguous to the surface protective layer, incorporating an isocyanate compound into the other layer, and curing these layers.

The present invention specifically includes the following aspects.

According to one aspect of the present invention, there is provided a decorative sheet comprising: a substrate sheet; a contiguous layer provided on the substrate sheet; and a surface protective layer provided on the contiguous layer, the surface protective layer comprising an ionizing radiation-curing resin composition, the contiguous layer comprising a compound containing active hydrogen, the surface protective layer further comprising an isocyanate compound, the contiguous layer and the surface protective layer being in a cured state.

According to another aspect of the present invention, there is provided a decorative sheet comprising: a substrate sheet; a contiguous layer provided on the substrate sheet; and a surface protective layer provided on the contiguous layer, the surface protective layer comprising an ionizing radiation-curing resin composition, the contiguous layer comprising an isocyanate compound, the surface protective layer further comprising a compound having active hydrogen, the contiguous layer and the surface protective layer being in a cured state.

According to a preferred embodiment of the present invention, the compound having active hydrogen is a compound having a group selected from the group consisting of polyol, COOH, and NH$_2$ groups.

According to another embodiment of the present invention, the contiguous layer further comprises an isocyanate group-containing acrylate monomer and/or prepolymer.

According to the present invention, an ionizing radiation-curing resin contained in the surface protective layer is self-reacted and consequently crosslinked or polymerized, and, in addition, the compound having active hydrogen, contained in any one of the contiguous layer and the surface protective layer, and the isocyanate compound contained in the other layer are chemically reacted with each other, permitting the contiguous layer and the surface protective layer to be strongly bonded to each other in the interface of these layers, which results in markedly increased ply adhesive strength and improved Hofmann's scratch resistance of the surface protective layer.

BRIEF DESCRIPTION OF THE DRAWING

FIG. 1 is a schematic cross-sectional view showing the layer construction of a decorative sheet according to an embodiment of the present invention.

BEST MODE FOR CARRYING OUT THE INVENTION

As shown in FIG. 1, the decorative sheet according to the present invention comprises: a substrate sheet 1; and a contiguous layer 4 and a surface protective layer 5 which have been formed in that order on the substrate sheet 1 and then cured. In the embodiment shown in FIG. 1, the contiguous layer 4 comprises a solid print layer 2 and a pattern layer 3.

In the decorative sheet of the present invention, substrate sheets usable herein include papers, plastics, metallic foils, and plates. Regarding the form of the substrate sheets, any of sheets, such as plastic sheets and nonwoven fabrics, metallic plates, wood plates, and plastic plates may be used. When a flexible sheet is used as a roll, a sheet thickness of 5 to 200 μm is preferable. Further, provision of a pattern of irregularities on the surface of the substrate sheet and a three-dimensional substrate sheet may also be used.

Papers used as the substrate sheet may be papers or fibrous sheets similar to papers. Examples thereof include papers using natural pulp, such as tissue papers, kraft papers, titanium papers, linter papers, vinyl wallpaper sheets, coated papers, paperboards, gypsum liner boards, and parchment papers; and sheets made of inorganic fibers, such as glass fibers, asbestos, potassium titanate fibers, alumina fibers, silica fibers, and carbon fibers, or fibers of organic polymer compounds, such as polyesters, polyamides, and acetalated production of polyvinyl alcohol (tradename: Vinylon).

They may be in any of bleached, unbleached, and colored states which may be selected according to the contemplated design.

Examples of plastic sheets usable as the substrate sheet include single layer or laminate sheets of stretched or unstretched plastic films of: olefinic resins, such as polyethylene, polypropylene, and polymethylpentene; vinyl resins, such as polyvinyl chloride, polyvinylidene chloride, polyvinyl alcohol, vinyl chloride/vinyl acetate copolymer, ethylene/vinyl acetate copolymer, ethylene/acrylic acid copolymer, ethylene/acrylic ester copolymer, ionomer, vinylon, and saponified ethylene/vinyl acetate copolymer; polyesters, such as polyethylene terephthalate, polybutyl terephthalate, and polyethylene naphthalate/isophthalate copolymer; acrylic resins, such as polymethyl (meth)

acrylate, polyethyl (meth)acrylate, and polybutyl (meth) acrylate; polyamides, such as nylon 6 and nylon 66; cellulose derivatives, such as cellulose triacetate and cellophane; polystyrols; polycarbonates; polyallylates; and polyimides. Metals usable in the metallic foil include aluminum, stainless steel, iron, and copper.

Other substrate sheets suitable in the present invention include: wood plates, such as wood veneers, laminated woods, particle boards, and medium-density fiber boards (MDF); gypsum-based boards, such as gypsum boards and gypsum slag boards; and calcium silicate boards. Other examples thereof include: fiber cement boards, such as asbestos cement boards, concrete boards, lightweight gas concrete boards, extrusion blown cement boards, pulp cement boards, asbestos cement boards, and wood chip cement boards; ceramic boards, such as earthenware plates, porcelain, stoneware, earthenware, glass, and enamels; metallic sheets or plates, such as steel, galvanized, polyvinyl chloride sol coated steel, aluminum, copper, and stainless sheets or plates; thermoplastic resin sheets or plates, such as polyolefin, acyclic resin, ABS, and polycarbonate sheets or plates; phenolic resin, urea resin, unsaturated polyester, and polyurethane sheets or plates; and the so-called fiber-reinforced plastic (FRP) sheets or plates prepared by impregnating an epoxy, melamine, or diallyl phthalate resin, into glass fibers, nonwoven fabrics, papers, and other various fibrous substrates and then performing curing; and composite substrate sheets prepared by laminating two or more of the above various substrate sheets.

The contiguous layer according to the present invention may be formed by simply coating or impregnating the above substrate sheet with a polyol compound or an isocyanate group-containing acrylate monomer and/or prepolymer.

In the embodiment shown in FIG. 1, the contiguous layer is constituted by a solid print layer and a pattern layer. In the present invention, however, the construction of the contiguous layer is not limited to this.

According to the present invention, a specific example of the ionizing radiation-curing resin used in the surface protective layer is a composition, curable with an ionizing radiation, comprising a suitable mixture of a prepolymer, an oligomer and/or a monomer having in its molecule a polymerizable unsaturated bond or an epoxy group. The term "ionizing radiation" used herein means, among electromagnetic waves or charged particle beams, those having energy quantum satisfactory for inducing polymerization or crosslinking of molecules, and ultraviolet light or electron beams are generally used.

Examples of prepolymers and oligomers usable herein include: unsaturated polyesters which are condensates of unsaturated dicarboxylic acids with polyhydric alcohols; (meth)acrylates, such as polyester (meth)acrylate, polyether (meth)acrylate, epoxy (meth)acrylate, urethane (meth) acrylate, and melamine (meth)acrylate; and cationic polymerizable epoxy compounds.

In the present invention, the solubility parameter (SP value) of the ionizing radiation-curing resin is usually 9.7 to 11.0, preferably 9.9 to 10.5. An SP value of less than 9.7 results in unsatisfactory strength of bonding to the substrate sheet, unsatisfactory power for holding spherical particles used in the regulation of gloss on the surface, and poor scratch resistance. On the other hand, an SP value exceeding 11.0 in some cases makes it impossible to meet the requirement for the strength of bonding to the substrate sheet when the resin is coated onto paper or a plastic film.

The SP value referred to herein is calculated as described in "POLYMER ENGINEERING AND SCIENCE, Vol. 14, 174 (1974)." When two or more ionizing radiation-curing resins are used as a mixture, the SP value is the weighted average of the SP values of respective ionizing radiation-curing resins.

Isocyanate compounds usable in the surface protective layer and/or the contiguous layer according to the present invention include: aliphatic, alicyclic, or aromatic di- or triisocyanate compounds, such as 2,4-tolylene diisocyanate, 2,6-tolylene diisocyanate, diphenylmethane-4,4'-diisocyanate, polyphenylmethane polyisocyanate called "crude MDI," xylylene diisocyanate, isophorone diisocyanate, hexamethylene diisocyanate, dicyclohexylmethane-4,4'-diisocyanate, and triphenyl-methane triisocyanate; and isocyanate-terminated, low-molecular weight adducts prepared by reacting a polyisocyanate compound with a low-molecular weight glycol or triol, for example, dipropylene glycol, 1,6-hexanediol, 1,2, 6-hexanetriol, or trimethylolpropane.

A compound having a group selected from the group consisting of polyol, COOH, and $NH_2$ groups may be preferably used as the compound having active hydrogen contained in the surface protective layer or the contiguous layer according to the present invention. It is also possible to use a urethane resin with an excess of polyol being added thereto.

Preferred polyol compounds usable herein include monomer diol and triol and polymer diol and triol containing mainly a repeating unit chain of an alkylene contributing to the molecular weight. A typical polymer polyol include a monomer polyol consisting essentially of any one of a straight chain terminated with a hydroxyl group and a branched chain and preferably has 2, 3, 4 or more hydroxyl groups. For example, those comprising ethylene glycol, propylene glycol, glycerin, trimethylolpropane, 1,2,6-hexanetriol, butenediol, sucrose, glucose, sorbitol pentaerythritol, mannitol, triethanolamine, n-methyldimethanolamine, and cyclic aromatic and aliphatic and triols. Preferred are polyester polyol, polyether polyol, acrylic polyol, and epoxy polyol.

In the present invention, an acrylate monomer and/or a prepolymer having an isocyanate group may further be added to the surface protective layer and/or the contiguous layer. A compound having one or more acryloyl groups in its molecule and one or more isocyanate groups in its terminal and/or side chain is preferred as the acrylate monomer and/or prepolymer having an isocyanate group.

Further, fillers, such as calcium carbonate, silica, and alumina, viscosity depressants, levelling agents, colorants, and sheeny pigments may also be added to the surface protective layer from the viewpoints of imparting suitability for coating and imparting features to the surface state.

Spherical particles may be used as an additive for improving the abrasion resistance of the surface protective layer. Spherical particles may be those having a surface surrounded by a smooth curved surface, such as those having a spherical shape and a shape close to a sphere, such as a flattened, elliptical shape. Preferably, the spherical particles are free from a protrusion or a corner particularly on the surface of the particles, that is, free from cutting edges. As compared with irregular particles made of an identical material, the spherical particles function to improve the abrasion resistance of the surface protective layer. Further, they have features including that they do not abrade a coating device and, even after curing of the coating, do not abrade other material which comes into contact therewith, and the transparency can be improved. The above effect is significant particularly when there is no cutting edge.

The content of the spherical particles contained in the surface protective layer according to the present invention is usually 5 to 30% by weight, preferably 5 to 25% by weight, particularly preferably 5 to 15% by weight.

When the content of the spherical particles is less than 5% by weight, the scratch resistance is unsatisfactory. On the other hand, when it exceeds 30% by weight, the binder effect exerted by the ionizing radiation-curing resin is deteriorated, raising a problem such as lowered flexibility.

In general, the diameter of the spherical particles is preferably 5 to 100 μm. When it is less than 5 μm, there is a possibility that the coating becomes opaque. On the other hand, when the average particle diameter exceeds 100 μm, the surface smoothness of the coating is likely to lower. The smaller the diameter of the spherical particles, the lower the abrasion resistance. On the other hand, the abrasion resistance improves with increasing the diameter of the spherical particles. In this case, however, for some thickness, uniform coating becomes difficult. For example, a surface protective layer thickness of 10 to 30 μm is contemplated, the particle diameter of the spherical particles is preferably 10 to 50 μm.

More preferably, the average particle diameter of the spherical particles is selected according to the thickness of the surface protective layer. In particular, when the average thickness of the surface protective layer is t (mm) with the average particle diameter of the spherical particles being d (mm), it is preferred to select spherical particles so as to satisfy the following formula (1). When the average particle diameter d (mm) of the spherical particles exceeds 2.0 t, the spherical particles are exposed on the surface of the surface protective layer, often leading to deteriorated appearance. On the other hand, when the average particle diameter d (mm) is less than 0.3 t, the abrasion resistance is likely to be unsatisfactory.

$$0.3\ t \leq d \leq 2.0\ t \tag{1}$$

Any material may be used for the spherical particles so far as the hardness is higher than the ionizing radiation-cured resin, and inorganic particles and/or organic particles may be used. The difference in hardness between the spherical particles and the ionizing radiation-cured resin may be measured in terms of Mohs hardness, Vickers hardness and the like. For example, the hardness in terms of Mohs hardness is preferably not less than 1, and the Knoop hardness is preferably not less than 1300 g/mm$^2$, more preferably not less than 1800 g/mm$^2$.

The Knoop hardness referred to herein is a micro indentation hardness measured with a Knoop indenter and is a numerical value expressed by the quotient determined by dividing a load used for creating a diamond-shaped dent before the test by the projected area of indentation determined from the length of the longer diagonal of permanent indentation. This testing method is described in ASTM C-849.

Materials for spherical particles include inorganic particles of α-alumina, silica, chromium oxide, iron oxide, diamond, and graphite, and organic resin particles, such as synthetic resin beads of crosslinked acrylic resins. α-Alumina may be fused alumina, alumina produced by Bayer's process or the like. Other inorganic particles usable herein include zirconia, titania, and an eutectic mixture thereof with fused alumina or alumina produced by Bayer's process.

An example of a method for bringing the shape of these inorganic particles to a spherical one is to spray a melt prepared by heating a pulverized irregular inorganic compound of the above type at a high temperature above the melting point.

Particularly preferred spherical particles are spherical α-alumina because it has very high hardness and is very effective in imparting abrasion resistance and spherical particles can be relatively easily obtained. The spherical α-alumina is described in Japanese Patent Laid-Open No. 56269/1990. Specifically, a curing agent, such as alumina hydrate, halide compound, or boron compound, or a crystallizing agent is added in a small amount to a pulverized product of fused alumina or sintered alumina, and the mixture is heat treated at a high temperature of 1400° C. for 2 hr or more. This reduces cutting edges of the alumina and, at the same time, provides spherodized alumina. Such spherical alumina is commercially available in various average particle diameters as "Spherical Alumina AS-10, AS-20, AS-30, AS-40, and AS-5" from Showa Denko K. K.

The spherical particles may be surface treated to enhance the adhesion to the binder or to improve the dispersibility. For example, treatment with a fatty acid, such as stearic acid, results in improved dispersibility. Further, surface treatment with a silane coupling agent can improve the adhesion between the spherical particles and the ionizing radiation-curing resin used as the binder and, in addition, can improve the dispersibility of the particles in the coating liquid composition. Silane coupling agents usable herein include an alkoxysilane having in its molecule a radical polymerizable unsaturated bond, such as methacryl, and an alkoxysilane having in its molecule a functional group, such as epoxy, amino, or mercapto. For the silane coupling agent, preferably, the type of the radical polymerizable unsaturated bond or the functional group is selected according to the type of the crosslinking resin used with the spherical particles, for example, in such a manner that an alkoxysilane having a radical polymerizable unsaturated bond is used in the case of an ionizing radiation-curing resin, such as (meth)acrylate, and an alkoxysilane having an epoxy or amino group is used in the case of a two-component curing type urethane resin.

Any conventional method may be used without limitation for treating the surface of the spherical particles with the silane coupling agent. Examples thereof include a dry method wherein a predetermined amount of the silane coupling agent is sprayed while vigorously stirring the spherical particles and a method wherein, after the spherical particles are dispersed in a solvent, such as toluene, a predetermined amount of the silane coupling agent is added followed by a wet reaction. The amount of the silane coupling agent necessary for the treatment of the spherical particles is preferably such that the minimum covering area of the silane coupling agent based on the specific surface area 100 of the spherical particle is not less than 10. When the minimum covering area of the spherical particles is less than 10 based on the specific surface area 100 of the spherical particles, the contemplated effect is small.

The surface protective layer according to the present invention may be formed by directly coating a coating liquid composition onto the contiguous layer. In this case, coating methods usable herein include gravure coating, roll coating, flow coating, and Komma coating. Although the viscosity of the ionizing radiation-curing composition, when coated, is determined by coating method and coverage, it is preferably not more than 1000 cP. The composition may be of a non-solvent type not containing a volatile solvent or a solvent type containing a volatile solvent. When the non-solvent type is used and coating at room temperature is difficult due to high viscosity, it is possible to use a method wherein the ionizing radiation-curing composition is heated to 40 to 80° C. to lower the viscosity to a suitable value, for example, not more than 1000 cP, and then coated.

The coating thickness is 3 to 100 μm, preferably 5 to 30 μm.

Regarding a device for ionizing radiation irradiation used for curing the ionizing radiation-curing composition, light sources, such as ultra-high pressure mercury lamps, high pressure mercury lamps, low pressure mercury lamps, carbon arcs, black light lamps, and metal halide lamps, may be used in the case of ultraviolet irradiation.

Electron beam sources usable herein include various electron beam accelerators, such as a Cockcroft-Walton accelerator, a van de Graaff accelerator, a resonance transformer accelerator, an insulated core transformer accelerator, a linear accelerator, a Dyamitron accelerator, and a high frequency accelerator. The exposure dose of the electron beam is about 0.1 to 30 Mrad, preferably about 1 to 10 Mrad at an energy of usually 100 to 10000 keV, preferably 100 to 300 keV.

When the exposure dose is less than 0.1 Mrad, the curing is likely to be unsatisfactory. On the other hand, when the exposure dose exceeds 30 Mrad, the cured coating or the substrate sheet is likely to be damaged.

When the ionizing radiation-curing resin layer is cured by exposure to ultraviolet light, at least one photoreaction initiator selected from benzoin, benzoin methyl ether, acetophenone, Michler's ketone, diphenyl sulfite, dibenzyl sulfide, diethyl oxide, triphenyl biimidazole, and isopropyl-N,N-dimethylaminobenzoate may be used in an amount of 0.1 to 10 parts by weight based on 100 parts by weight of the ionizing radiation-curing composition.

The exposure dose of the ultraviolet light is preferably 50 to 100 mj/cm$^2$. When the exposure dose of the ultraviolet light is less than 50 mj/cm$^2$, the curing is likely to be unsatisfactory. On the other hand, when it exceeds 100 mj/cm$^2$, the cured coating is likely to be yellowed.

The crosslink-to-crosslink average molecular weight after the reaction of the ionizing radiation-curing resin according to the present invention is usually 150 to 1000, preferably 200 to 1000, particularly preferably 250 to 800. When crosslink-to-crosslink average molecular weight is less than 150, the flexibility of the whole resin is lowered, leading to cracking upon bending of the coating. On the other hand, when it exceeds 1000, the resin per se becomes excessively flexible, so that the power for holding the spherical particles is unsatisfactory, resulting in unsatisfactory scratch resistance.

The crosslink-to-crosslink average molecular weight A referred to herein is a numerical value determined by the following equation (2).

$$A = m/[2 \times (f-1)]$$

wherein f represents the average number of polymerizable functional groups of the ionizing radiation-curing resin and m represents the average molecular weight.

A pattern layer may be printed on the substrate sheet according to the present invention. Printing methods usable herein include conventional sheet-feed or rotary printing or offset printing using an intaglio (including a gravure plate), lithography, relief, or stencil, and, in addition, electrostatic printing and ink jet printing. Among them, gravure rotary printing, flexo rotary printing, and silk screen printing are preferred.

It is also possible to use a method wherein a transfer film with a pattern layer formed on a release film is used to transfer the pattern layer onto a predetermined substrate sheet.

A printing ink for forming a pattern layer or a solid print layer is selected from conventional inks compatible with a printing method used and raising no problem associated with the adhesion to the substrate sheet and post-treatment.

The ink is constituted by a composition comprising a durable pigment, an extender pigment, a thermoplastic resin, a binder, such as a reaction curable resin, a curing agent, an additive, a solvent and the like.

For the binder, preferably, in order to react with the surface protective layer to increase the adhesive strength, a polyol may be added, and an acrylate monomer and/or a prepolymer having an isocyanate group may be incorporated.

The pattern layer may be suitably selected from reproductions of naturally occurring products with gradation, such as woodgrain, grain, and texture, solid printing, such as letters, symbols, and line drawing, abstract patterns and the like.

Irregularities may be created in the surface protective layer, and embossing utilizing pressing under heating may be used for this purpose. Specifically, a solvent type coating liquid composition for a surface protective layer is coated and dried to form a tack-free layer which, in an uncured state, is heated at 80 to 180° C., embossed by means of a cooled embossing roll with a convex pattern, and cooled followed by irradiation with an ionizing radiation to form a cured surface protective layer having a irregular pattern.

A color may be provided in the concave portion created by the embossing. For example, a wiping method may be used for this purpose. Specifically, an ink is coated on the whole surface of the sheet including the concave portions by doctor blade coating, knife coating or the like, and the ink is removed by means of a squeegee from the surface of the sheet except for the concave portions. Thus, the concave portions are filled with the ink remaining unremoved and hence colored. The ink used for coloring may be one prepared by dispersing a colored pigment, such as an inorganic or sheeny pigment, in a vehicle comprising a binder comprised of a thermoplastic resin, a thermosetting resin, an ionizing radiation-curing resin, a plasticizer, a lubricant and the like and a water and/an organic solvent.

The present invention will be described in more detail with reference to the following examples.

EXAMPLE 1

As shown in FIG. 1, a paper, with ply reinforcement, having a basis weight of 30 g/m$^2$ (manufactured by Sanko Paper Manufacturing Corporation) was provided as a substrate sheet 1, and a contiguous layer 4 constituted by a solid print layer 2 and a woodgrain pattern layer 3 was gravure-printed using a gravure ink UE (tradename, manufactured by Showa Ink Ind. Co., Ltd.) containing an acrylic polyol on one side of the substrate sheet 1.

Subsequently, the following "ionizing radiation-curing resin composition 1 for a surface protective layer" was roll-coated on the whole surface of the pattern layer at a coverage of 10 g/m$^2$, followed by irradiation and curing with an electron beam from an electron beam irradiation device (manufactured by ESI) under conditions of 175 KeV and 5 Mrad to form a surface protective layer 5, thereby preparing a decorative sheet 10 of Example 1.

Ionizing radiation-curing resin composition 1 for a surface protective layer:

| | |
|---|---|
| Urethane acrylate oligomer | 48 parts by weight |
| Polyfunctional acrylate monomer | 45 parts by weight |
| Tolylene diisocyanate | 5 parts by weight |
| Silicone acrylate | 2 parts by weight |

EXAMPLE 2

As shown in FIG. 1, a paper, with ply reinforcement, having a basis weight of 30 g/m$^2$ (manufactured by Sanko Paper Manufacturing Corporation) was provided as a substrate sheet 1, and a contiguous layer 4 constituted by a solid print layer 2 and a woodgrain pattern layer 3 was gravure-printed using a "gravure ink 1 for a contiguous layer" having the following composition on one side of the substrate sheet 1.

| | |
|---|---|
| Acrylic polyol | 20 parts by weight |
| Acrylate monomer having isocyanate group | 5 parts by weight |
| Pigment | 10 parts by weight |
| Solvent | 65 parts by weight |

Subsequently, the "ionizing radiation-curing resin composition 1 for a surface protective layer" used in Example 1 was roll-coated on the whole surface of the pattern layer at a coverage of 10 g/m$^2$, followed by irradiation and curing with an electron beam from an electron beam irradiation device (manufactured by ESI) under conditions of 175 KeV and 5 Mrad to form a surface protective layer 5, thereby preparing a decorative sheet 10 of Example 2.

EXAMPLE 3

As shown in FIG. 1, a paper, with ply reinforcement, having a basis weight of 30 g/m$^2$ (manufactured by Sanko Paper Manufacturing Corporation) was provided as a substrate sheet 1, and a contiguous layer 4 constituted by a solid print layer 2 and a woodgrain pattern layer 3 was gravure-printed using the "gravure ink 1 for a contiguous layer" used in Example 2 on one side of the substrate sheet 1.

Subsequently, the following "ionizing radiation-curing resin composition 2 for a surface protective layer" was roll-coated on the whole surface of the pattern layer at a coverage of 10 g/m$^2$, followed by irradiation and curing with an electron beam from an electron beam irradiation device (manufactured by ESI) under conditions of 175 KeV and 5 Mrad to form a surface protective layer 5, thereby preparing a decorative sheet 10 of Example 3.

Ionizing radiation-curing resin composition 2 for a surface protective layer:

| | |
|---|---|
| Urethane acrylate oligomer | 48 parts by weight |
| Polyfunctional acrylate monomer | 20 parts by weight |
| Tolylene diisocyanate | 30 parts by weight |
| Silicone acrylate | 2 parts by weight |

EXAMPLE 4

A contiguous layer 4 constituted by a solid print layer 2 and a woodgrain pattern layer 3 was formed in the same manner as in Example 1. The following "ionizing radiation-curing resin composition 3 for a surface protective layer" was then roll-coated on the whole surface of the pattern layer at a coverage of 10 g/m$^2$, followed by irradiation and curing (average crosslink-to-crosslink molecular weight 272) with an electron beam from an electron beam irradiation device (manufactured by ESI) under conditions of 175 KeV and 5 Mrad to form a surface protective layer 5, thereby preparing a decorative sheet 10 of Example 4.

Ionizing radiation-curing resin composition 3 for a surface protective layer:

| | |
|---|---|
| Urethane acrylate oligomer (average molecular weight 1700) | 20 parts by weight |
| Trimethylolpropane acrylate (average molecular weight 296, number of functional groups 3) | 20 parts by weight |
| Bisphenol A ethylene oxide diacrylate (average molecular weight 500, number of functional groups 2) | 20 parts by weight |
| Phenol ethylene oxide diacrylate (average molecular weight 236, number of functional groups 1) | 20 parts by weight |
| Tolylene diisocyanate | 5 parts by weight |
| α-Alumina particles (average molecule diameter 30 μm, Knoop hardness 1800 g/mm$^2$) | 15 parts by weight |

EXAMPLE 5

A paper, with ply reinforcement, having a basis weight of 30 g/m$^2$ (manufactured by Sanko Paper Manufacturing Corporation) was provided as a substrate sheet, and a contiguous layer constituted by a solid print layer and a woodgrain pattern layer was gravure-printed using a gravure ink containing tolylene diisocyanate on one side of the substrate sheet.

Subsequently, the following "ionizing radiation-curing resin composition 5 for a surface protective layer" was roll-coated on the whole surface of the pattern layer at a coverage of 10 g/m$^2$, followed by irradiation and curing with an electron beam from an electron beam irradiation device (manufactured by ESI) under conditions of 175 KeV and 5 Mrad to form a surface protective layer 5, thereby preparing a decorative sheet of Example 5.

Ionizing radiation-curing resin composition 5 for a surface protective layer:

| | |
|---|---|
| Urethane acrylate oligomer | 40 parts by weight |
| Polyfunctional acrylate monomer | 45 parts by weight |
| Acrylic polyol | 13 parts by weight |
| Silicone acrylate | 2 parts by weight |

Comparative Example 1

A contiguous layer 4 constituted by a solid print layer 2 and a woodgrain pattern layer 3 was formed in the same manner as in Example 1. The following "ionizing radiation-curing resin composition 4 for a surface protective layer" was then roll-coated on the whole surface of the pattern layer at a coverage of 10 g/m$^2$, followed by irradiation and curing (average crosslink-to-crosslink molecular weight 272) with an electron beam from an electron beam irradiation device (manufactured by ESI) under conditions of 175 KeV and 5

Mrad to form a surface protective layer 5, thereby preparing a decorative sheet 10 of Comparative Example 1.

Ionizing radiation-curing resin composition 4 for a surface protective layer:

| Urethane acrylate oligomer | 49 parts by weight |
|---|---|
| Polyfunctional acrylate monomer | 49 parts by weight |
| Silicone acrylate | 2 parts by weight |

Comparative Example 2

As shown in FIG. 1, a paper, with ply reinforcement, having a basis weight of 30 g/m² (manufactured by Sanko Paper Manufacturing Corporation) was provided as a substrate sheet 1, and a contiguous layer 4 constituted by a solid print layer 2 and a woodgrain pattern layer 3 was gravure-printed using the following "gravure ink 2 for a contiguous layer" on one side of the substrate sheet 1.

Gravure ink 2 for a contiguous layer:

| Acrylic polyol | 20 parts by weight |
|---|---|
| Tolylene diisocyanate | 5 parts by weight |
| Pigment | 10 parts by weight |
| Solvent | 65 parts by weight |

Subsequently, an "ionizing radiation-curing resin composition 5 for a surface protective layer" having the following composition was roll-coated on the whole surface of the pattern layer at a coverage of 10 g/m², followed by irradiation and curing with an electron beam from an electron beam irradiation device (manufactured by ESI) under conditions of 175 KeV and 5 Mrad to form a surface protective layer 5, thereby preparing a decorative sheet 10 of Comparative Example 2.

Ionizing radiation-curing resin composition 5 for a surface protective layer:

| Urethane acrylate oligomer | 49 parts by weight |
|---|---|
| Polyfunctional acrylate monomer | 49 parts by weight |
| Tolylene diisocyanate | 5 parts by weight |
| Silicone acrylate | 2 parts by weight |

The samples prepared in Examples 1 to 4 and Comparative Examples 1 and 2 were aged at 40° C. for 3 days and tested for adhesion and Hofmann's scratch test, and the results are summarized in Table 1.

(Adhesion test)

Cross-cuts each having a size of 1 mm square were provided in an area of 10×10 mm from the surface protective layer side, and a pressure-sensitive adhesive tape was adhered to the whole face of the surface protective layer and then rapidly separated to measure the number of cross-cuts remaining unremoved on the sample. For samples having strong adhesion, the test was repeated ten times.

(Hofmann's scratch test)
This test was performed using a tester manufactured by BYK Gardner Inc.

TABLE 1

| Sample | Adhesion | | Hofmann's scratch test |
|---|---|---|---|
| Ex. 1 | 10 times | 100/100 | 350 g |
| Ex. 2 | 10 times | 100/100 | 400 g |
| Ex. 3 | 10 times | 100/100 | 500 g |
| Ex. 4 | 10 times | 100/100 | 500 g |
| Ex. 5 | 10 times | 100/100 | 300 g |
| Comp. Ex. 1 | 3 times | 50/100 | 100 g |
| Comp. Ex. 2 | 5 times | 50/100 | 200 g |

In the decorative sheet of the present invention, any one of a contiguous layer and a surface protective layer provided on a substrate layer contains a compound having active hydrogen with the other layer containing an isocyanate compound. Therefore, according to the present invention, an ionizing radiation-curing resin contained in the surface protective layer is self-reacted and consequently crosslinked or polymerized, and, in addition, the compound having active hydrogen, contained in any one of the contiguous layer and the surface protective layer, and the isocyanate compound contained in the other layer are chemically reacted with each other, permitting the contiguous layer and the surface protective layer to be strongly bonded to each other in the interface of these layers, which results in markedly increased ply adhesive strength and improved Hofmann's scratch resistance of the surface protective layer.

What is claimed is:

1. A decorative sheet comprising:

a substrate sheet;

a contiguous layer provided on the substrate sheet; and a surface protective layer provided on the contiguous layer, the surface protective layer comprising an ionizing radiation-curing resin composition, the contiguous layer comprising a compound containing active hydrogen, the surface protective layer further comprising an isocyanate compound, and the contiguous layer and the surface protective layer being in a cured state, wherein the contiguous layer does not contain said isocyanate compound and the surface protective layer does not contain said compound containing active hydrogen.

2. The decorative sheet according to claim 1, wherein the compound having active hydrogen is a compound having a group selected from the group consisting of a polyol, COOH, and $NH_2$ groups.

3. The decorative sheet according to claim 1, wherein the contiguous layer further comprises an isocyanate group-containing acrylate monomer and/or prepolymer.

4. The decorative sheet according to claim 1, wherein the contiguous layer comprises a solid print layer and/or a pattern layer.

5. The decorative sheet according to claim 1, wherein the isocyanate compound contained in the surface protective layer is an isocyanate group-containing acrylate monomer and/or prepolymer.

6. A decorative sheet comprising:

a substrate sheet;

a contiguous layer provided on the substrate sheet; and a surface protective layer provided on the contiguous layer, the surface protective layer comprising an ionizing radiation-curing resin composition, the contiguous layer comprising an isocyanate compound, the surface protective layer further comprising a compound containing active hydrogen, and the contiguous layer and the surface protective layer being in a cured state, wherein the contiguous layer does not contain said compound containing active hydrogen and the surface protective layer does not contain said isocyanate compound.

7. The decorative sheet according to claim 6, wherein the compound having active hydrogen is a compound having a group selected from the group consisting of a polyol, COOH, and $NH_2$ groups.

8. The decorative sheet according to claim 6, wherein the contiguous layer further comprises an isocyanate group-containing acrylate monomer and/or prepolymer.

9. The decorative sheet according to claim 6, wherein the contiguous layer comprises a solid print layer and/or a pattern layer.

10. The decorative sheet according to claim 6, wherein the isocyanate compound contained in the surface protective layer is an isocyanate group-containing acrylate monomer and/or prepolymer.

* * * * *